US010249047B2

(12) United States Patent
Jia et al.

(10) Patent No.: US 10,249,047 B2
(45) Date of Patent: Apr. 2, 2019

(54) SYSTEM AND METHOD FOR DETECTING AND TRACKING MULTIPLE MOVING TARGETS BASED ON WIDE-AREA MOTION IMAGERY

(71) Applicant: Intelligent Fusion Technology, Inc, Germantown, MD (US)

(72) Inventors: Bin Jia, Germantown, MD (US); Sixiao Wei, Germantown, MD (US); Zhijiang Chen, Germantown, MD (US); Genshe Chen, Germantown, MD (US); Carolyn Sheaff, Rome, NY (US); Khanh Pham, Kirtland AFB, NM (US); Erik Blasch, Arlington, VA (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 0 days.

(21) Appl. No.: 15/914,868

(22) Filed: Mar. 7, 2018

(65) Prior Publication Data
US 2018/0197297 A1 Jul. 12, 2018

Related U.S. Application Data

(63) Continuation-in-part of application No. 15/263,761, filed on Sep. 13, 2016, now Pat. No. 9,940,724.

(51) Int. Cl.
G06T 7/20 (2017.01)
G06T 1/20 (2006.01)
(Continued)

(52) U.S. Cl.
CPC .................. G06T 7/20 (2013.01); G06F 9/54 (2013.01); G06F 9/547 (2013.01);
(Continued)

(58) Field of Classification Search
CPC ...... G06F 9/54; G06F 9/547; G06F 17/30203; G06F 17/30256; G06F 17/3028;
(Continued)

(56) References Cited

U.S. PATENT DOCUMENTS 9,082,019 B2   7/2015   Sheu et al.
2008/0192116 A1  8/2008   Tamir et al.
(Continued)

FOREIGN PATENT DOCUMENTS

CN   102810250 A   12/2012
CN   105654511 A   6/2016

OTHER PUBLICATIONS

Liu K. et al., "A Real-Time High Performance Computation Architecture for Multiple Moving Target Tracking Based on A/ide-Area Motion Imagery via Cloud and Graphic Processing Units", Sensors, 2017, pp. 1-16.*

(Continued)

Primary Examiner — Gregory F Cunningham
(74) Attorney, Agent, or Firm — Anova Law Group, PLLC

(57) ABSTRACT

Method and system for detecting and tracking multiple moving targets based on wide-area motion imagery are provided. The method includes receiving a task request from a client; sending the task request to a local agent; acquiring to-be-processed images from the client, in response to the task request; calling an Hadoop API and checking a running status of a Hadoop system for an available resource in the Hadoop system; when a resource in the Hadoop system is available, pushing the to-be processed images to a back-end Hadoop distributed file system (HDFS); running tracking algorithms of multiple moving objects associated with the to-be-processed images to provide tracking results of the multiple moving objects; when the Hadoop system is com- (Continued)

pleted in running the tracking algorithms, generating and sending a message to the local agent; and sending the tracking results of the multiple moving objects from the HDFS to the front-end database.

20 Claims, 13 Drawing Sheets

(51) Int. Cl.
 *G06F 9/54* (2006.01)
 *G06F 17/30* (2006.01)
 *H04L 29/08* (2006.01)
(52) U.S. Cl.
 CPC .... *G06F 17/3028* (2013.01); *G06F 17/30203* (2013.01); *G06F 17/30256* (2013.01); *G06T 1/20* (2013.01); *G06T 2207/30241* (2013.01); *H04L 67/12* (2013.01)
(58) Field of Classification Search
 CPC . H04L 67/12; G06T 2207/30241; G06T 7/20; G06T 1/20
 USPC .......................................................... 382/103
 See application file for complete search history.

(56) References Cited

U.S. PATENT DOCUMENTS

| | | | |
|---|---|---|---|
| 2011/0296411 A1* | 12/2011 | Tang | G06F 9/45545 718/1 |
| 2013/0271757 A1 | 10/2013 | Kang et al. | |
| 2015/0207813 A1* | 7/2015 | Reybok | H04L 63/145 726/22 |
| 2016/0110885 A1 | 4/2016 | Blasch et al. | |
| 2016/0188594 A1* | 6/2016 | Ranganathan | G06F 17/3048 707/769 |
| 2016/0292700 A1* | 10/2016 | Gopal | G06Q 30/0201 |
| 2018/0074855 A1* | 3/2018 | Kambatla | G06F 9/505 |

OTHER PUBLICATIONS

AFRL: "Columbus large image format (CLIF) 2006", Website. Sep. 13, 2016 <https://www.sdms.afrl.af.mil/index.php?collection=clif2006> pp. 1-2.

Jia, B. et al., "Aircraft ground monitoring with high performance computing multicore enabled video tracking," 2014 IEEE/AIAA 33rd Digital Avionics Systems Conference (DASC), Colorado Springs, CO, 2014, pp. 6B2-1-6B2-9.

Liu, K. et al., "A Cloud Infrastructure for Target Detection and Tracking Using Audio and Video Fusion," IEEE Conference on Computer Vision and Pattern Recognition Workshop, 2015, pp. 74-81.

Liu, K. et al., "A real-time orbit satellites uncertainty propagation and visualization system using graphics computing unit and multi-threading processing," IEEE/AIAA 34th Digital Avionics Systems Conference, 2015, pp. 8A2-1-8A2-10.

Liu, K. et al., "Optical flow and principal component analysis-based motion detection in outdoor videos," EURASIP Journal on Advances in Signal Processing, 2010, 2010:680623. pp. 1-7.

Liu, K. et al., "Fast motion detection from airborne videos using graphics processing unit ," Journal of Applied Remote Sensing, vol. 6, No. 1, 2012, pp. 061505-1-061505-14.

Ryu C et al., "Extensible Video Processing Framework in Apache Hadoop", IEEE International Conference on Cloud Computing Technology and Science, 2013, pp. 305-308.

Jin B et al. "Aircraft Ground Monitoring With High Performance Computing Multicore Enabled Video Tracking", 33rd Digital Avionics Systems Conference, 2014, pp. 6B2-1-6B2-9.

Dean J et al., "MapReduce: Simplified Data Processing on Large Clusters", To Appear in OSDI 2004, Google, Inc., pp. 1-13.

Liu K. et al., "A Real-Time High Performance Computation Architecture for Multiple Moving Target Tracking Based on Wide-Area Motion Imagery via Cloud and Graphic Processing Units", Sensors, 2017, pp. 1-16.

Shi X et al. "Multi-target Tracking by Rank-1 Tensor Approximation", Computer Vision Foundation, 2013, pp. 2387-2394.

* cited by examiner

SYSTEM AND METHOD FOR DETECTING AND TRACKING MULTIPLE MOVING TARGETS BASED ON WIDE-AREA MOTION IMAGERY

CROSS-REFERENCES TO RELATED APPLICATIONS

This application is a continuation-in-part of U.S. patent application Ser. No. 15/263,761, filed on Sep. 13, 2016, the entire content of which is incorporated herein by reference.

GOVERNMENT RIGHTS

This invention was made with Government support under Contract No. FA8750-15-C-0025, awarded by the United States Air Force Research Laboratory. The U.S. Government has certain rights in this invention.

FIELD OF THE DISCLOSURE

The present disclosure relates to the field of detection of multiple moving objects and, more particularly, relates to system implementation for real-time detecting multiple moving targets based on large scale images.

BACKGROUND

Threat detection of people, vehicles, and other (PVO) as well as person-vehicle interactions (e.g., dismounts) of possible malicious intent are difficult problems due to the complexity of the problem space. The challenges include cluttered scenes with obscured elements (e.g., buildings), varying camera sensor resolutions, different environmental conditions (e.g., illuminations), and unknown motivation of individuals. When there are MUltiple MOving Targets (MU-MOTs), there is a need for high-performance computing intelligent machine learning tracking, recognition, threat identification solutions.

Methods and techniques can be incorporated to aid analysts to track and identify dismounts using modern large scale visual sensors such as the Wide-area Motion Imagery (WAMI) systems. Such systems typically produce an overwhelmingly large amount of information. For example, the Autonomous Real-time Ground Ubiquitous Surveillance-Imaging System (ARGUS-IS) produces tens of thousands of moving target indicator (MTI) detections from city-size urban areas (over 40 square kilometers) at video rates of greater than 12 Hz.

The large scale data input challenges existing situational awareness algorithms in time complexity and storage requirements. The lack of computationally efficient MTI analysis tools has become a bottleneck for utilizing WAMI data in urban surveillance. Both hardware and software high-performance computing solutions are sought to handle the large scale data requirements.

Therefore, there is a need to provide a system and method for detecting and tracking multiple moving targets based on wide-area motion imagery to overcome these challenges.

BRIEF SUMMARY OF THE DISCLOSURE

One aspect of the present disclosure provides a method for detecting and tracking multiple moving targets based on wide-area motion imagery. In a method, a message queuing (MQ) platform receives a task request from a client in a front-end web layout and then sends the task request to a local agent. In response to the task request, the local agent acquires to-be-processed images from the client. The local agent calls an Hadoop application programming interface (API) and checking a running status of a Hadoop system for an available resource in the Hadoop system. When a resource in the Hadoop system is available, the local agent pushes the to-be processed images to a back-end Hadoop distributed file system (HDFS). The Hadoop system runs tracking algorithms of multiple moving objects associated with the to-be-processed images to provide tracking results of the multiple moving objects. When the Hadoop system is completed in running the tracking algorithms, a message is generated and sent to the local agent, and the local agent further sends the message to the MQ platform. The local agent sends the tracking results of the multiple moving objects from the HDFS to the front-end database.

Another aspect of the present disclosure provides a system for detecting and tracking multiple moving targets based on wide-area motion imagery. The system includes a message queuing (MQ) platform; a local agent; and a Hadoop system. The message queuing (MQ) platform receives a task request from a client in a front-end web layout, and sends the task request to the local agent. The local agent acquires to-be-processed images from the client, in response to the task request, calls an Hadoop application programming interface (API) to check a running status of a Hadoop system for an available resource in the Hadoop system, and pushes the to-be processed images to a back-end Hadoop distributed file system (HDFS), when a resource in the Hadoop system is available. The Hadoop system runs tracking algorithms of multiple moving objects associated with the to-be-processed images to provide tracking results of the multiple moving objects, generates and sends a message to the local agent, when the Hadoop system is completed in running the tracking algorithms. The local agent further sends the message to the MQ platform, and sends the tracking results of the multiple moving objects from the HDFS to the front-end database.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
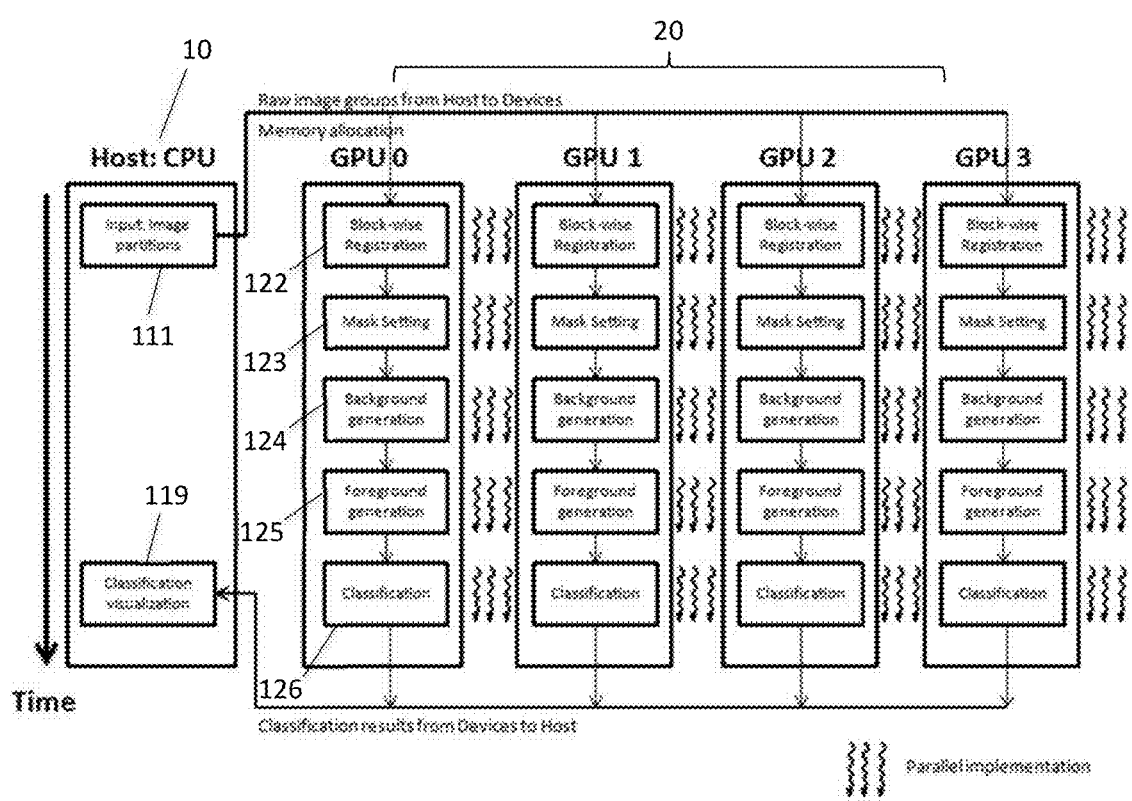
FIG. 1 illustrates an exemplary method for detecting multitude of objects in accordance with various embodiments of present disclosure.

Reference can now be made in detail to exemplary embodiments of the disclosure, which are illustrated in the accompanying drawings. Wherever possible, the same reference numbers can be used throughout the drawings to refer to the same or like parts.

In accordance with various embodiments, the present disclosure provides a method for detecting multiple moving objects based on Wide Area Motion Imagery (WAMI) datasets via parallel computation in graphics processing units (GPUs). In accordance with some other embodiments, the present disclosure provides a High Performance Computing based system to implement the disclosed method.

Note that, Wide Area Motion Imagery (WAMI), in its various forms, is also referred to as Wide Area Airborne Surveillance (WAAS), Wide Area Persistent Surveillance (WAPS), Persistent Wide Area Surveillance (PWAS), Wide Area Surveillance (WAS), and Large Volume Streaming Data (LVSD), etc. Simply put, WAMI captures a video of an area the size of a town or city, day and night. It is a system that uses one or more cameras mounted on the some form of a gimbal on an aerial platform, such as an aircraft or blimp, to capture a very large area on the ground, from about once every second up to several times per second. Persistent surveillance captures the same general area on the ground over a length of time.

In some embodiments, median background modeling is implemented via GPUs to tackle the high computation complexity of the multiple moving objects detection. For avoiding the requirement of the large memory and throughput of large scale images, a novel fast block-wise image registration and multiple moving target detection infrastructure based on the GPUs are provided.

In some embodiments, an asynchronous multiple object detection can be achieved by the disclosed high performance computing based system. For example, detection or classification of multiple objects of interest from image groups, frame 0 to frame 7 for instance, may be monitored based on asynchronous exchange information between GPUs and central processing units (CPUs) and adaptive parallel computing implementation on the CPU-GPU system.

For example, detection or classification of multiple objects of interest may be performed within the framework of a Compute Unified Device Architecture (CUDA) based parallel computing infrastructure for the application of monitoring. The disclosed method and system may innovate an operator-friendly graphical user interface (GUI) for observing and monitoring the detection results (e.g., in a form of boxes to highlight) in real-time. The disclosed parallel computing based approach has a general purpose in the sense that the same idea can be applied and extended to other types of methods, such as Pedestrian Detection based on large scale urban images.

Comparing to applying the detection process in central processing unit (CPU) alone, the application of parallel computing structure based on CUDA Basic Linear Algebra Subroutines (cuBLAS) can reach a real-time outcome of detection and visualization. Moreover, the obtained detection or the classification results for the multiple objects may indicate that the parallel-based approach provides dramatically improved, speed-up performance in real-time and under realistic conditions.

Referring to FIG. 1, an exemplary method for detecting multitude of objects is shown in accordance with various embodiments of present disclosure.

As illustrated, the method can be implemented by a system including a CPU host 10 and multiple GPUs 20.

In some embodiments, the CPU host 10 includes at least one central processing unit (CPU). In the example as shown in FIG. 1, four graphics processing units GPU0, GPU1, GPU2 and GPU3 can be used to apply parallel image processing. In some embodiments, multiple GPUs can be used for rapidly manipulating memory to accelerate the image processing. Any suitable number of GPUs can be used in the system according to various embodiments of the present disclosure.

At step 111, the CPU host can perform image partitions to divide the input images into multiple raw image groups, and can distribute the multiple raw image groups to the multiple GPUs. For processing the large resolution images, it is inevitable to divide the images into partitions since the GPUs include multiple CUDA computation cores with limited memory. It is more efficient for the GPUs to process the partitions of sub-images rather than an entire intact raw image.

In some embodiments, the input images are large scale images generated by WAMI systems. For example, each input image has more than 8,000,000 pixels in resolution. Objects in an input image may only comprise a few pixels.

For example, the size of a vehicle can range between 4 pixels and 70 pixels in grayscale image groups.

In some embodiments, the input images are real-time collected images. For example, the frame rate of the input images can be equal or larger than two frames per second.

In some embodiments, the method further includes adaptive memory allocation corresponding to the size of block-wise partitioned image groups associated with the GPUs.

Figure 2:
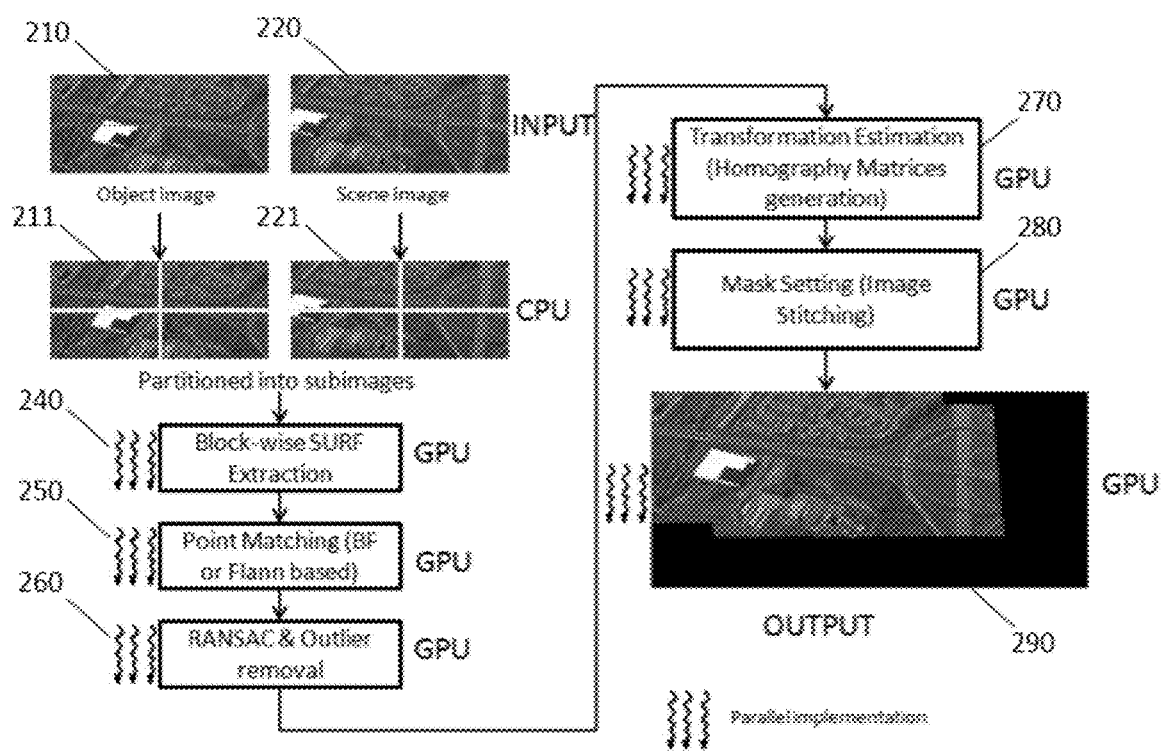
FIG. 2 illustrates an exemplary process of image partition, block-wise registration, and mask-setting in accordance with various embodiments of present disclosure.

As a specific example, as illustrated in FIG. 2, two successive raw input images include a front frame and a rear frame. The front frame can be an object image 210, and the rear frame can be a scene image 220. A CPU can perform an image segmentation processes to respectively divide the object image 210 into four object sub-images 211, and divide the scene image 220 into four scene sub-images 221.

Turning back to FIG. 1, at step 122, block-wise image registration are performed by CUDA based registration kernels of GPUs. In some embodiments, the block-wise image registration kernel is configured to have one cluster integrated with eight groups of four image partitions at a time instant.

Block-wise image registration is a highly parallelized image processing. The multiple GPUs are very efficient to process the partitioned image blocks. The speed-up performance is very promising based on real-data experiment and test. The scene images are then warped to the coordinate of the object images based on the block-wise transformation estimation.

Referring to FIG. 2, an exemplary detailed process of image partition, block-wise registration, and mask-setting is shown in accordance with various embodiments of present disclosure.

After the object image 210 being divided into four image sub-images 211, and the scene image being divided into four scene image partitions 221, the four image sub-images 211 and four scene image partitions 221 can be separately input into multiple GPUs.

In some embodiments, the block-wise image registration process performed in parallel by the multiple GPUs can include four steps described in the following.

At 240, block-wise speeded up robust features (SURF) extraction can be performed. In this step 240, point correspondences between two images of the same scene or object can be found. For example, some interest point can be selected at distinctive locations in the image, such as corners, blobs, and T-junctions. Then, the neighborhood of every interest point can be represented by a feature vector. Next, the feature vectors can be matched between the two images. In some embodiments, the matching is based on a distance between the vectors, e.g., the Mahalanobis or Euclidean distance.

In some embodiments, the block-wise SURF extraction can be achieved by relying on integral images for image convolutions, and by building on the strengths of the leading existing detectors and descriptors. For example, a Hessian matrix-based measure can be used for the detector, and a distribution-based descriptor for feature analysis.

At 250, point matching can be performed. In some embodiments, any suitable algorithm for performing fast approximate nearest neighbor searches in high dimensional spaces can be used to realize the point matching. For example, the point matching can be Brute-force (BF) based, or FLANN based.

At 260, random sample consensus (RANSAC) and outlier removal can be performed. The RANSAC algorithm is an iterative method to estimate parameters of a mathematical model from a set of observed data which contains outlier by random sampling of observed data. Given a dataset whose data elements contain both inliers and outliers, RANSAC uses the voting scheme to find the optimal fitting result. Therefore, RANSAC can be performed as a learning technique to find outlier points from the results of the point matching. And then the outlier points can be removed.

At 270, transformation estimation can be performed. In some embodiments, the transformation estimation can be applied among the object image blocks and corresponding scene image blocks to generate homography matrices. The estimated block-wise homography matrices can be used to warp the scene image blocks to the coordinate of the object image blocks.

Figure 3:
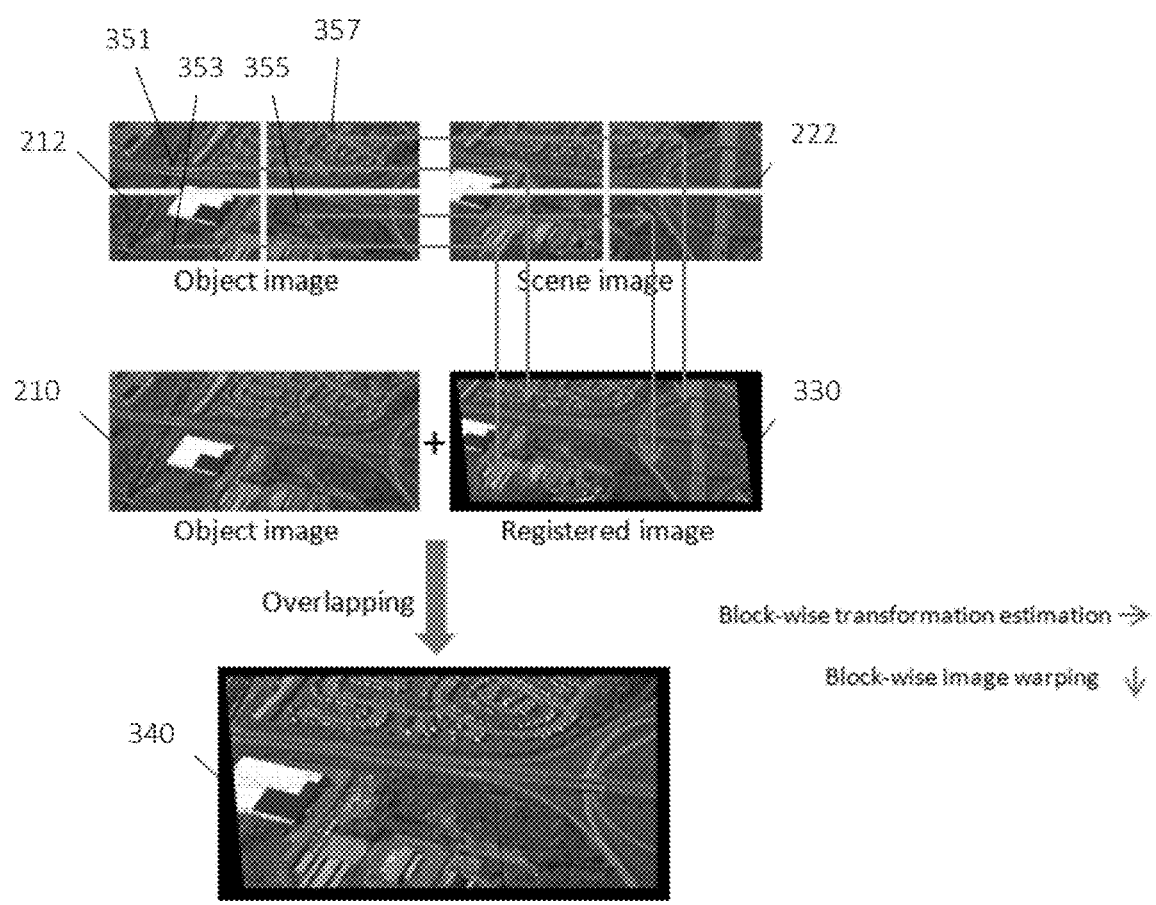
FIG. 3 illustrates an exemplary procedure of block-wise transformation estimation and block-wise image warping in accordance with various embodiments of present disclosure.

Referring to FIG. 3, an exemplary procedure of block-wise transformation estimation and block-wise image warping is shown in accordance with some embodiments.

As illustrated, the object image 210 can be divided into four image sub-images 211. For each image partition, at least one image partition feature can be identified. For example, the four image partition features 351, 353, 355, and 357 can be identified and recorded.

A scene image, which can be a frame overlapping with the frame of the object image, can also be divided into four image partitions 221. A block-wise transformation estimation process can match the identified image partition features on the four image partitions 221. Based on the new positions of the identified image partition features located in the four image partitions 221, each of the image partition of the scene image 221 can be registered. Therefore, a registered image 330 can be combined based on the registered image partition of the scene image 221.

Accordingly, turning back to FIG. 2, the image registration process can include feature extraction, feature matching, random sample consensus (RANSAC), and transformation estimation.

It should be noted that, local features such as scale-invariant feature transform (SIFT) and speeded up robust features (SURF) bring new potential for feature based WAMI image registration due to the scale invariance detector and the distinctiveness of the descriptor. However, the outstanding property of WAMI images is the overwhelming increase in the image size, which results in the prohibitive memory requirement and computational complexity. Thus coarse image registration usually takes unfavorable processing time based on CPU infrastructure. Moreover, local features such as SIFT and SURF are not supportive based on the smoothed images down-sampled either by Gaussian Pyramid or interlaced sampling. In the step of fast block-wise registration, the feature detection and feature description (extraction) are frequently used. The feature detection and description are speeded up based on the block-wise computation architecture.

Turning back to FIG. 1, mark settings for the registered image groups can be applied based on the block-wise image registration by mask setting kernels of GPUs at step 123.

Referring to step 280 in FIG. 2, portions of the registered images can be collected on a mask via image stitching by kernels of the GPUs. In some embodiments, when launching the mask setting or image stitching kernel, the number of groups of four image partitions is consistent with an available shared memory of the GPUs.

As can be seen in FIG. 3, the transformation estimation is applied among the object image blocks and corresponding scene image blocks. The estimated block-wise homography matrices generated by the transformation estimation can be used to warp the scene image blocks to the coordinate of the object image blocks. Accordingly, a fused image 340 can be obtained by overlapping the object image 210 and the registered image 330. Returning back to FIG. 2, the fused image 340 can be used as an output 290.

As illustrated in both FIGS. 1 and 2, the block-wise registration and mask-setting processes are highly parallel. Considering the fact that GPUs are designed to operate concurrently, the block-wise feature detection and description, the point matching, the RANSAC, the block-wise transformation estimation, and the block-wise image warping are all processed in GPUs. Only the image partition is performed in CPU.

Turning back to FIG. 1, at step 124, background generation are performed by background generation kernels of GPUs. The background generation can be performed through a median filter.

Figure 5:
FIG. 5 illustrates visualization of an exemplary background image in accordance with some other embodiments of the present disclosure.

In some embodiments, each background generation kernel is configured to have one node integrated with a group of eight registered images at a time instant. For example, background generation can be performed for each group of eight WAMI images based on the stitched image by GPUs to generate one background image. As an illustrative example, referring to FIG. 5, a visualization of an exemplary background image is shown accordance with some embodiments of the present disclosure.

At step 125, foreground generation kernels are performed by foreground generation kernels of GPUs. The foreground generation can be performed based on image differences.

Figure 6:
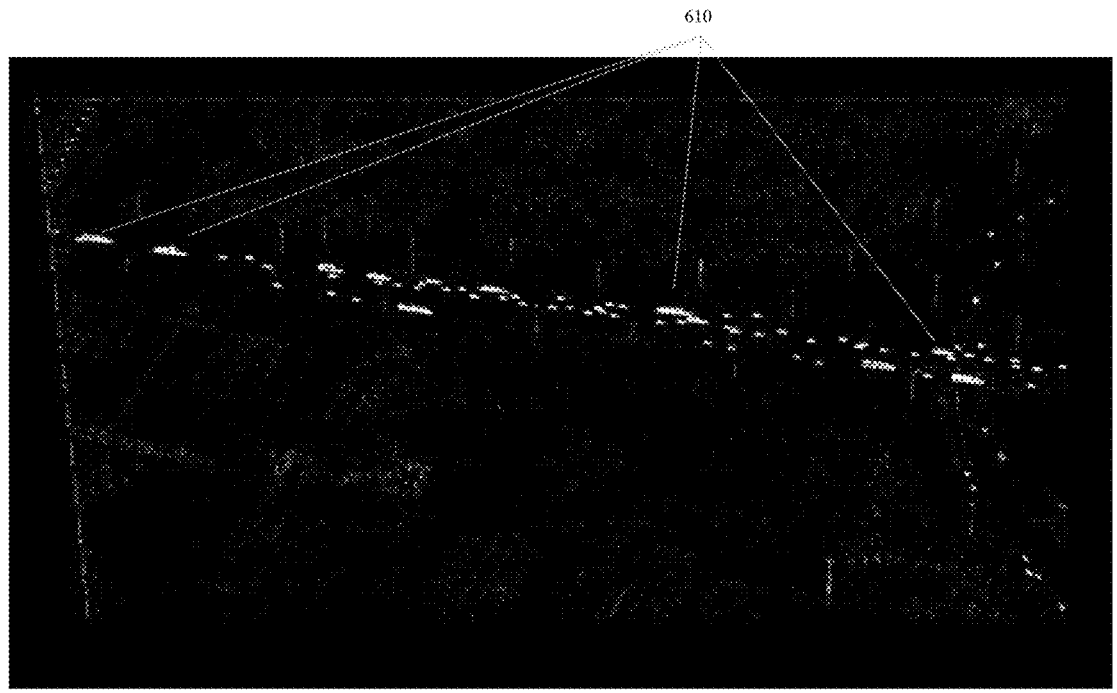
FIG. 6 illustrates visualization of an exemplary foreground image in accordance with various embodiments of present disclosure.

In some embodiments, each foreground generation kernel is configured to have one cluster integrated with a group of eight registered images at a time instant. For example, foreground generation can be performed for each group of eight WAMI images based on the background image by GPUs to generate eight corresponding foreground images. As an illustrative example, referring to FIG. 6, a visualization of an exemplary foreground image is shown accordance with some embodiments of the present disclosure. The highlighted objects 610 on the black background are the extracted foreground images such as vehicle images and/or people images.

Figure 4:
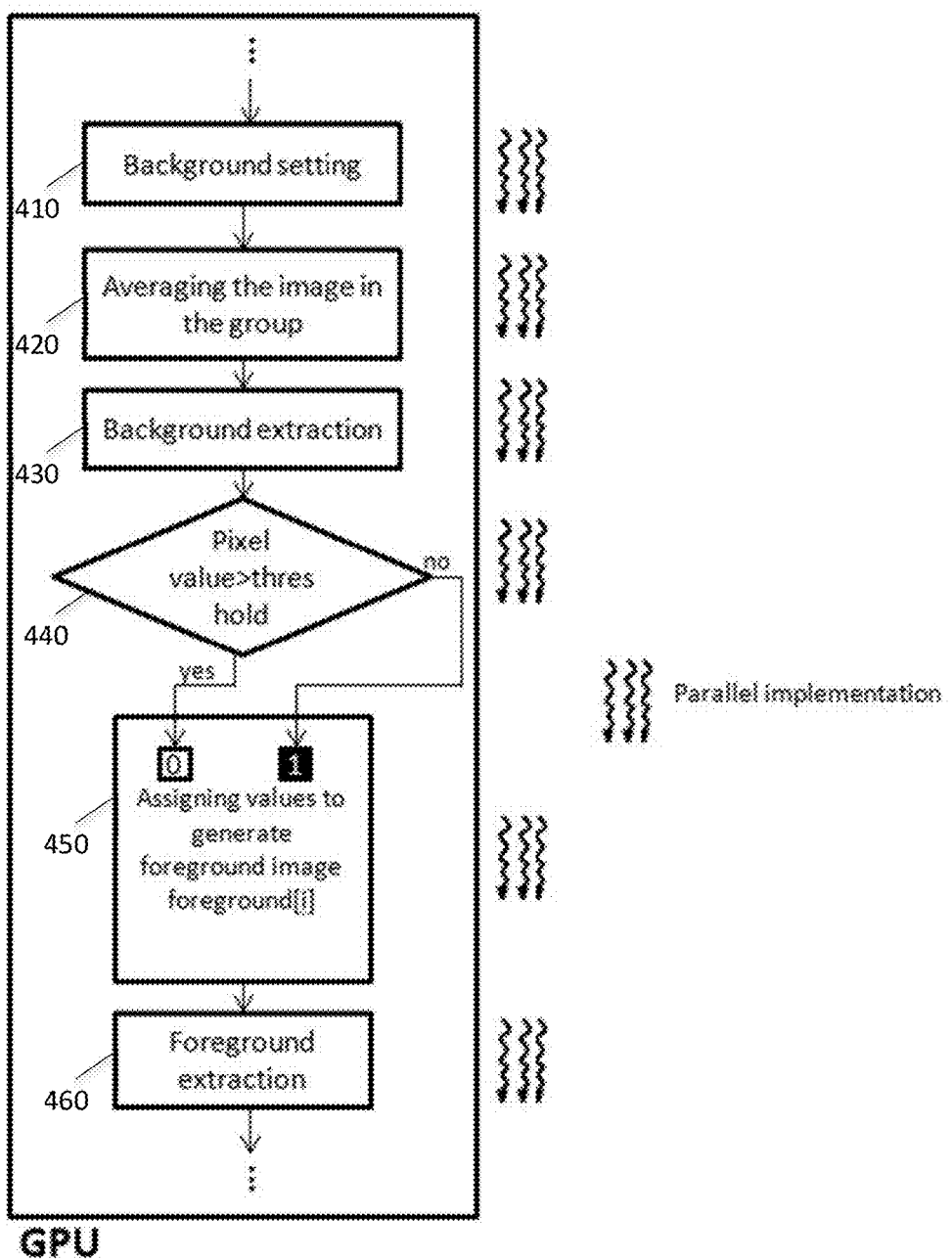
FIG. 4 illustrates a flowchart of background generation and foreground generation processes in accordance with some embodiments of the present disclosure.

Referring to FIG. 4, a flowchart of background generation and foreground generation processes is shown in accordance with some embodiments of the present disclosure.

As illustrated, the background generation process can include background setting at 410, averaging the image in the group at 420, and background extraction at 430. The background generation is a parallelized process implemented based on GPUs. Background setting is a step of setting the whole image to a mask with zero pixel values.

Noted that, CPU based background generation in the WAMI system is full of two-dimensional traversal of the image sequences. This operational structure costs a lot of computation especially when the input sequence is large size images. For instance, the background extraction performed in the system contains three nested FOR loops which are the size of height, the size of width and the size of the image groups.

Therefore, GPU computation can be applied to accelerate the background generation. The CUDA data structure dim3 is quite applicable in GPUs to solve such problems such as memory allocation and parallel computation since the input are three-channel images in a WAMI system. This computational structure, used to specify the grid and block size, has three members [x, y and z] when compiling with C++. Thus, it is applied to store the image groups in device memory. Computation of a tile based in the data structure dim3 can be arranged, such that interactions in each row can be evaluated in a sequential order, while separate rows are evaluated in parallel in the GPUs.

As illustrated in FIG. 4, the foreground generation process can include pixel value comparison at 440, assigning values to generate foreground image at 450, and foreground extraction at 460.

In some embodiments, the pixel values of output images 290 can be compared with a predetermined threshold value. For example, if a grey value of a pixel is larger than the predetermined threshold value ("yes" at step 440), the pixel can be determined as a portion of the foreground image, and the pixel can be assigned as a value of "0" at step 450. On the other hand, if a gray value of a pixel is smaller than the predetermined threshold value ("no" at step 440), the pixel can be determined as a portion of the background image, and the pixel can be assigned as a value of "1" at step 450.

The foreground generation is also a parallelized process implemented based on GPUs. CPU based foreground generation has the same problem as the background generation. The only difference is that the outer loop is the size of image group, and the inner loops are size of height and the size of width. Rather than as background generation, the output of foreground generation is a group of eight binary (black and white) foreground images. Since the input includes eight registered WAMI images, for the construction convenience of the GPU implementation, the two inner loops are performed in GPUs. This computational architecture based on the IF-ELSE statement is quite efficient in GPU platform.

In some embodiments. an implementation of Hyper-Q can further improved the speed-up performance of foreground generation. Hyper-Q is a flexible solution that allows connections for both Compute Unified Device Architecture (CUDA) streams and Message Passing Interface (MPI) processes. It enables multiple CPU cores to launch work on a single GPU simultaneously, thereby drastically increasing GPU utilization and slashing CPU idle time. In other words, Hyper-Q ensures the GPUs stay as occupied as possible.

Grid Management Unit (GMU) can be introduced to create multiple hardware work queues to reduce the synchronization time. With the GMU, streams such as grey value comparison (kernel compare( )) and foreground generation (kernel foreground( )) in the steps of foreground generation can be kept as individual pipelines of work.

A Hyper-Q feature on GPUs in the context of multi-thread/multi-process application with uncoordinated offloads to the GPUs during the CPU host computation is developed. In some embodiments, multiple workloads during the CPU host computation are sent back to GPUs. These components provide dynamic parallelism and CUDA output asynchronous transmission.

On a device with Hyper-Q disabled, the single work pipeline in hardware means that only concurrency can be seen between pairs of grey value comparison kernel from stream n and foreground kernel from stream n+1. While on a device with Hyper-Q, the synchronization time are eliminated and all the kernels can execute concurrently in the profile of the running time.

Figure 7:
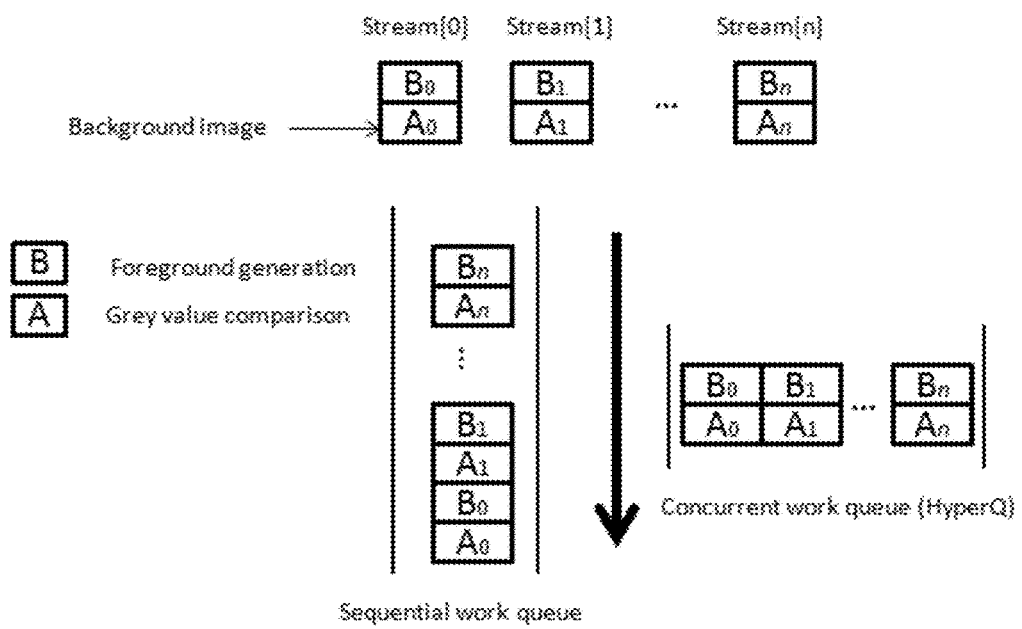
FIG. 7 illustrates an exemplary computation infrastructure of foreground generation applied based on Hyper-Q in accordance with various embodiments of present disclosure.

Referring to FIG. 7, an exemplary computation infrastructure of foreground generation especially applied based on Hyper-Q is shown in accordance with some embodiments of the present disclosure.

As illustrated, the running time of the devices implemented based on sequential work queue and concurrent work queue (Hyper-Q) is along the black arrow. A and B represent two parallel tasks: grey value comparison and foreground generation. In a sequential work queue, the processing of the tasks is in a serial manner and time-consuming. While in the concurrent work queue, the execution of the stream work is concurrent. Computation time spent in concurrent work queue is much less than sequential work queue.

Below sample code uses a depth-first launch as described above to demonstrate how Hyper-Q allows the independent kernels to be executed concurrently, regardless of the launch order. After initializing and checking the device properties, the code creates a number of streams nstreams and launches a pair of kernels into each stream as follows:

```
for (int i = 0, i < nstreams; i++){
    compare <<< gdim, bdim, smem, streams[i]>>> (images in device);
    foreground <<<gdim, bdim, smem, streams[i]>>> (images in device);
}
```

Each kernel is launched as a single thread, which simply executes a loop for a defined amount of time and saves the total number of clock cycle to memory, where gdim is the dimension of the grids, bdim is the dimension of the blocks and smem is the additional shared memory to reserve for each block. In our case, the configuration dim3 block(32,8) and dim3 grid((width+block.x−1)/block.x, (height+block.y−1)/block.y) is applied here.

Since many GPU applications are limited by the memory bandwidth of the compute system rather than by its compute performance, for Hyper-Q it is important to know how multiple simultaneous executions on the GPUs affect each other, especially with respect to sharing the GPU memory bandwidth. In some embodiments, eight streaming processes of foreground generation can be executed simultaneously.

Returning to FIG. 1, at step 126, classification can be performed by classification kernels of GPUs. In some embodiments, the classification process can be performed based on support vector machine (SVM).

In SVM classification, a histogram of oriented gradients (HOG) feature used in the detection can be implemented. It should be emphasized that the process to obtain HOG feature is computationally intensive. Gradients can be computed and gradient magnitude and orientations are obtained via convolution. In addition, trilinear interpolation and Gaussian weighting can be used to obtain the block histogram.

In some embodiments, one thread block in GPUs is responsible for the one HOG block. Each thread can work on one column of gradient orientations and magnitudes. Then each of the block normalization and SVM evaluation steps can be done by separate kernels. In some embodiments, eight threads per cell can be employed. Additionally, the kernel matrix computation used in the SVM classifier can be implemented on GPUs to speed up the performance of the HOG detector.

In some embodiments, probabilities or the confidence levels of each classified object of interest can be calculated based on SVM evaluation. The classified objects of interest include vehicles and people, and can be updated in an online or on-the-fly manner.

At step 119, multiple classification results can be transferred from the multiple GPUs 20 to the CPU host 10, and the CPU host 10 can perform a classification visualization process based on the multiple classification results to generated a classification image. The classification results generated by the multiple GPUs can be asynchronously transmitted from the GPUs to the CPU host to reduce or eliminate a synchronization time.

Figure 8:
FIG. 8 illustrates visualization of an exemplary classification image in accordance with various embodiments of present disclosure.

For example, referring to FIG. 8, a visualization of an exemplary classification image is shown accordance with some embodiments of the present disclosure. As illustrated, the classification image can be obtained based on the background image and foreground image shown in FIGS. 5 and 6 respectively. The final classification results of possible vehicle detection can be identified on the classification image.

In some embodiments, the initial configuration parameters of the registration, mask setting, background generation, foreground generation and classification are provided by the CPU host, and transferred from the CPU host to the GPUs, for the GPUs to generate the classification results according to the initial configuration parameters.

In some embodiments, a graphical user interface (GUI) can be generated for observing and monitoring the multiple objects detection in real-time during the image processing from the video stream. For example, a real-time GUI can be generated for illustrating background images, foreground images, and classification images, such as the background image, foreground image, and classification image shown in FIGS. 5, 6 and 8. As another example, final detection image corresponding to the detected objects of interest can be displayed through open source computer vision (OpenCV) library associated with the CPU host.

In various embodiments, cloud system may be used for detecting and tracking multiple moving targets based on WAMI. For example, image sets from WAMI sensor streaming may be used to detect and track objects of interest for real-time applications. A High Performance Computation (HPC) framework may be used and may include, for example, an Apache Hadoop distributed storage and distributed processing system; multiple GPUs for parallel computations; and a front-end web server for data storage and retrieving.

The Hadoop system (or Apache Hadoop framework) utilizes the MapReduce implementation to distribute the computational algorithms parallel on each high performance computing cluster. The Hadoop system uses multiple clusters, which includes multiple CPU and GPUs. The disclosed Hadoop system may include a Hadoop Distributed File System (HDFS), which is a distributed file-system that stores data across clusters. The disclosed Hadoop system may also include Hadoop YARN, which is a platform responsible for managing clusters resources. The disclosed Hadoop system may also include Hadoop MapReduce which is an implementation framework of the MapReduce implementation for large-scale data processing. In one embodiment, the disclosed tracking algorithms may be rewritten using Hadoop MapReduce framework.

Each high performance computing cluster includes a CPU and multiple GPUs. The MapReduce implementation includes a Mapper which performs registration, background generation, foreground generation, vehicle detection, data association and trajectories generation and a Reducer which performs a summary operation (generating the target track identifications (IDs) and saving the detection and trajectories information in HDFS (Hadoop Distributed File System)).

Moreover, the MapReduce implementation arranges the distributed clusters and runs the GPU tasks, for example, in a Compute Unified Device Architecture (CUDA) parallel computing platform. In the disclosed MUMOTs detection and tracking system, registration, background generation and foreground generation are performed in GPUs.

A front-end web server is developed to present the most useful data and obtain abstract and meaningful information for human analysts. Specifically, a web-based data visualization system is developed to communicate with the Apache Hadoop cluster for conducting the real-time tracking analysis and user interaction.

Comparing the MUMOTs tasks with CPUs or GPUs alone, the application of distributed and parallel computing structure based on Apache Hadoop MapReduce (and/or CUDA Basic Linear Algebra Subroutines) can achieve a real-time outcome of detection and tracking. Moreover, the obtained detection and recognition results for the MUMOTs indicate that the parallel-based approach provides drastically improved, speed-up performance in real-time and under realistic conditions. One of the contributions of the present disclosure is that a non real-time algorithm achieves real-time performance based on the application of a cloud and GPU parallel computing infrastructure.

Cloud and parallel computation has become increasingly important for computer vision and image processing systems. A cloud-based framework uses cloud computing, which is constructed within high performance computing clusters to include the combination of CPUs and GPUs. A local server in the cloud (or cloud system) is provided for the data storage and retrieving and a web portal server is provided for the user. Based on the local server, the tracking results (e.g., trajectories of the objects of interest) generated from the computation nodes in a Hadoop Distributed File System (HDFS) are converted and saved in the data base. From the web portal, the user chooses algorithms, datasets and system parameters such as the number of computation nodes in operation, the image registration methods and the processing units (with or without Hadoop, CPU or GPU processing). A controller in the cloud can then decide the amount of computing resources to be allocated to the task in order to achieve the user's requirements of performance. Inside the cloud, each computation node is within each cluster. One CPU and multiple GPUs are included each cluster. The computation nodes are capable of running various high performance computation tasks. For example, the high performance tasks for image-based detection and tracking include registration, background generation, foreground generation, detection, data association, and trajectories generation which are run by several threads in one or more computation nodes in parallel.

In one embodiment, the cloud-based high performance computation framework may process the WAMI data concurrently using different computational facilities, including computer clusters and GPUs. The task manager/splitter, e.g., configured with Mapper, is in charge of dividing the incoming image into sub-images which are processed in parallel. The sub-results obtained are then linked together by the task manager/linker. The final results, such as tracks, are stored in the database and provided for visualization. Exemplary computation modules include a register, detector and associator in the cloud system.

High Performance Computer (HPC) may serve as computation nodes in the cloud. All components of the same task have access to share storage in the cloud in the Hadoop Distributed File System (HDFS). The user only interacts with the system through the Web Graphic User Interface (GUI). The user's computing requests from the web GUI are passed to the controllers for further processing. The controller assigns an appropriate number of jobs to computation nodes for each request. Each node runs one assigned task (Register, Detector and Associator) and sends the results back to the HDFS and then the local server. The web GUI can then display the processing results in real-time once the backend processing finishes.

The local server uses a database to store real-time performance of all tasks in the system. The local server can also monitor the cloud's performance such as average CPU/GPU load and memory usage.

The user can choose what metrics to be displayed on the web GUI and can call other visual analytic tools such as the Global Positioning System (GPS) coordinates of the objects of interest at a particular instant, the 3-dimensional trajectories of an object, or pattern of life (PoL) analysis of moving objects, such as MUltiple MOving Targets (MUMOTs) or multiple moving objects.

In an exemplary MUMOTs detection and tracking system, the cloud and GPU system perform the following tasks.

A human monitoring and/or interacting, defined herein as a user chooses a system configuration, such as tracking algorithms, for example, options of various register, detector and associator algorithms; assigns computation nodes in operation and the selection of processing units; coordinates with the machine task manager; and sends comments to the system to initiate a task.

A web GUI communicates with the user and, by receiving input commands, displays processing results and presents analytical system performance.

A "controller", as part of the disclosed system (or a machine system), receives commands from the web GUI, makes decisions on how many resources are needed to satisfy the required performances inputted from the user and/or task manager, assigns jobs and tasks to computation nodes in the cloud, calculates processing speed in real-time, and informs the web GUI the processing results.

For visualization: a local server collects performance metrics such as processing speed and system load, and provides the web GUI query service when there is a need to display the metrics.

For high performance computing clusters, each high performance computing cluster (hardware) can act as a register, detector or associator in the system. The tasks which can be performed in CPU and/or GPUs are decided by the controller.

Figure 10:
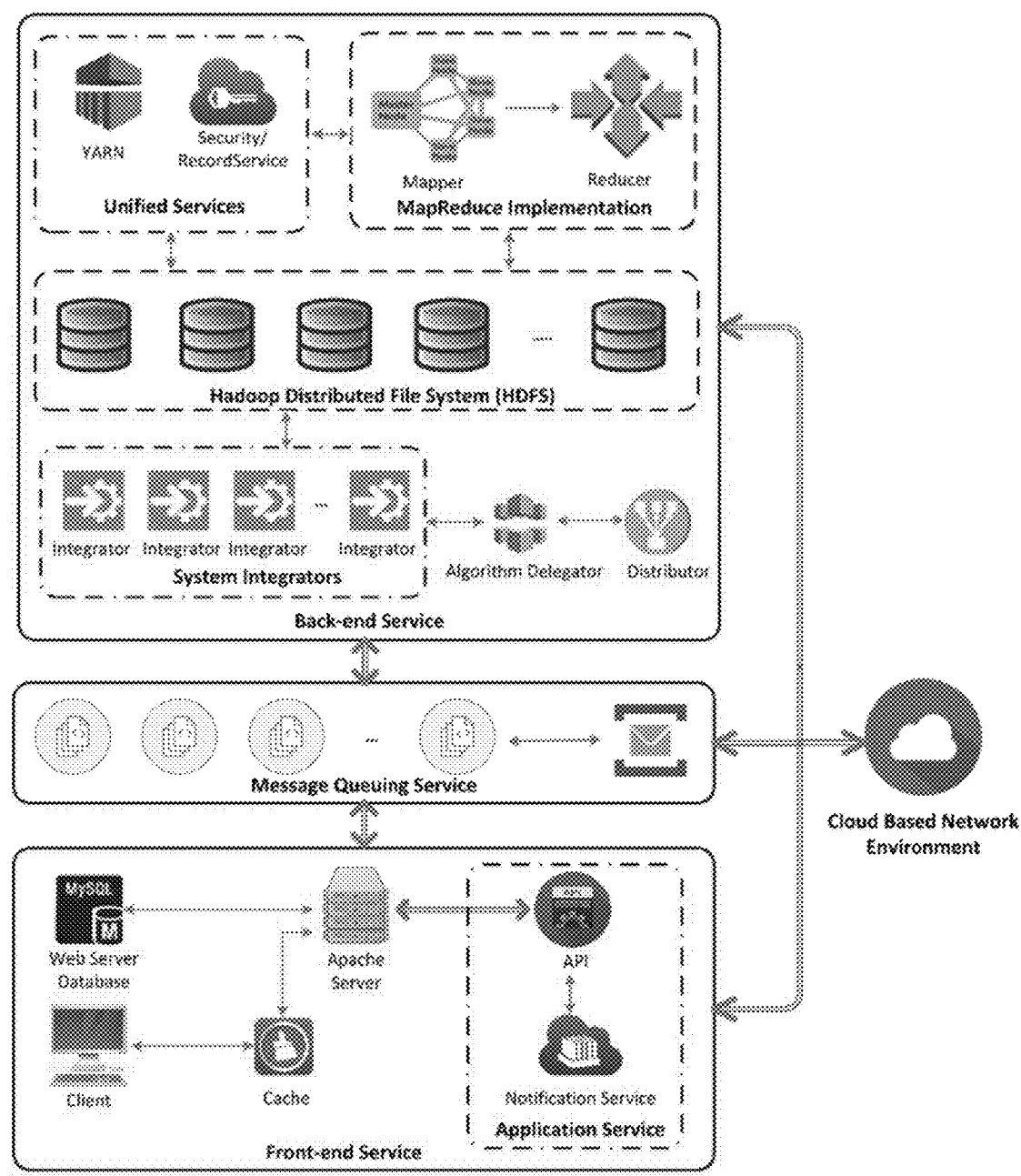
FIG. 10 presents an exemplary system implementation architecture of front-end and back-end in cloud-based high performance computation implementation in accordance with various embodiments of the present disclosure.

For the system implementation architecture, a distributed, multi-node Apache Hadoop cluster was designed in the back-end for conducting the real-time computation analysis, which includes a HDFS based on HPCs running on Ubuntu Linux. In the front-end, a web-based data visualization system presents the most useful data and obtains meaningful information for human analysts in support of high level information fusion, situation awareness, and context-enhance information fusion. FIG. 10 details the system architecture of both the front-end and the back-end systems in cloud based network environment.

For the back-end service as illustrated in FIG. 1, the Hadoop is the main framework which implements all the tracking algorithms. For example, YARN is a framework for job scheduling and cluster resource management with security/record service, and MapReduce is a system based parallel processing implementation for large data sets. Once Hadoop is running, a master machine can assign computation works towards different slaver machines, and then all the outputs from slaver machines can be collected and stored in the HDFS, which provides high-throughput access to application data. The service integrators can perform the interaction between back-end service and message queuing (MQ) service, and then all the tracking algorithms can be performed by algorithm delegator and distributor. The message queuing can be of any form such as Representational state transfer (RESTful), protobuf, apache, rabbitMQ, etc. Eventually the back-end service can provide analyzed real-time data to the front-end database for user requests.

Figure 12:
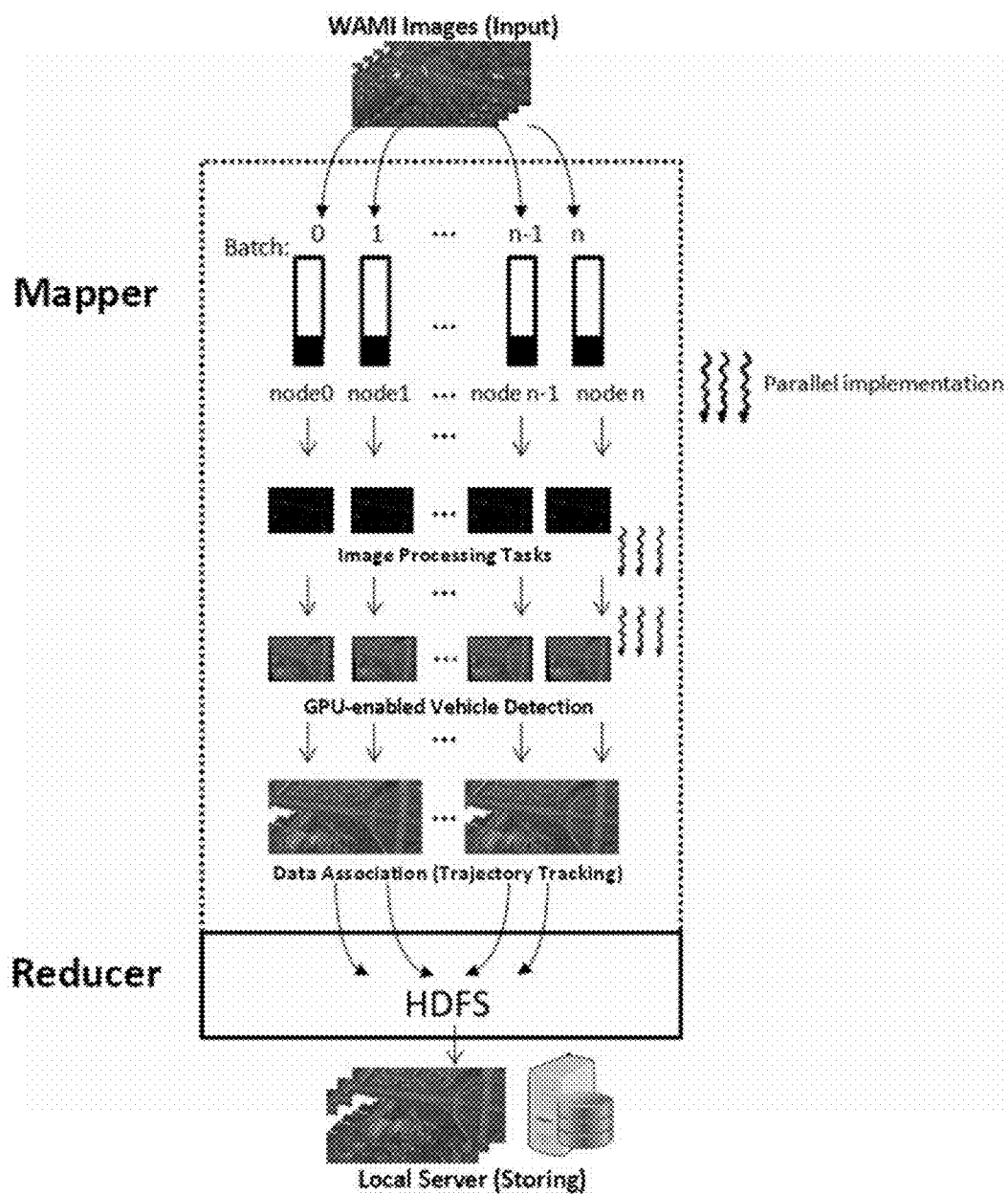
FIG. 12 depicts an exemplary cloud and GPU high performance computation infrastructure with MapReduce implementation for multiple moving targets (MUMOTs) detection and tracking in accordance with various embodiments of the present disclosure.

Here shows an example of MapReduce implementation in Hadoop. There are two main exemplary processes: Mapper and Reducer. All the WAMI image processing tasks perform registration, background generation, and foreground estimation within the MapReduce implementation, while vehicle detection and data association are performed on a cloud using GPU enabled computation nodes. FIG. 12 depicts cloud and GPU high performance computation infrastructure with detail MapReduce procedures for MUMOTs detection and tracking.

The Mapper of the system starts with user's selection of the WAMI image dataset. The Controller can automatically distribute the images to the computation nodes. A master node (could be node0) populates the jobs into the computing cluster nodes and launches a number of operational nodes. Based on each operational-computation node, the image registration transforms different sets of data into one coordinate system, one of which is a homograph matrix generated from the image registration that can further be extended to achieve the rotation and translation coordinate matrices. With the rotation and translation matrices, the coordinate in the previous frames are projected in to the current frames and thus a general background of the image sets can be generated through the image stitching techniques.

The background generation process includes a background setting step, an image averaging step, and a background extraction step. The background extraction is a parallelized process implemented based on the GPU which uses data structure dim3.

The Foreground estimation process includes a pixel value comparison step, a value assigning step, and a foreground extraction step. It also implements the Hyper-Q computation framework to enable multiple CPU cores to launch a job on a single GPU simultaneously for increasing GPUs utilization, minimizing CPU idle time, and introducing a Grid Management Unit (GMU) to create multiple hardware work queues to reduce synchronization time.

The object classification, which can be any method such as machine learning Deep Neural Networks (DNN), pattern recognition SVM (Support Vector Machine), or object tracking evidential reasoning, processes implements histogram of oriented gradients (HoG) to compute color gradients and obtain gradient magnitudes and orients via convolution, and then calculates probabilities or confidence levels of the MUMOTs based on the gradient magnitudes and orientations.

The Data association process is the key component to combine the detected MUMOTs in the consecutive WAMI frames into target trajectories.

Figure 13:
FIG. 13 depicts an example result of MUMOTs detection and tracking in accordance with various embodiments of the present disclosure.

The Reducer in the Hadoop system performs a summary operation which generates the target labels (such as track identification) and saves the detection and trajectories information in HDFS. FIG. 13 shows an output example of MUMOT detection within MapReduce implementation.

For the front-end service as illustrated in FIG. 1, the exemplary components are Client, Web Server, Web Server Database and Application Services. The client is directly connected to the Web Server via Cache. When any functions are required by client, the web server can call their related application programming interface (API) in Application Services to create information requests to the Web Server Database. Once user requests are sent out from front-end web GUI, they can be accepted by the service distributor. Then multi-threading and multi-stream based processing can be triggered to execute and generate tracking results (and/or image results) by service integrators. Finally, the demonstration results can be sent back to front-end web-based display for the user interaction. Notification services such as email verification can be enabled at final stage to inform client for checking the results.

In various embodiments, the image results may include intermediate image processing results for obtaining the tracking results. For example, the image results may include a background image, a foreground image, a registration image, a detection image, etc.

The tracking results may be extracted from image results but without keeping intermediate images. For example, the tracking results may include trajectories of objects (e.g., MUMOTs). Each trajectory includes the locations of a single, same object in consecutive images.

Figure 14:
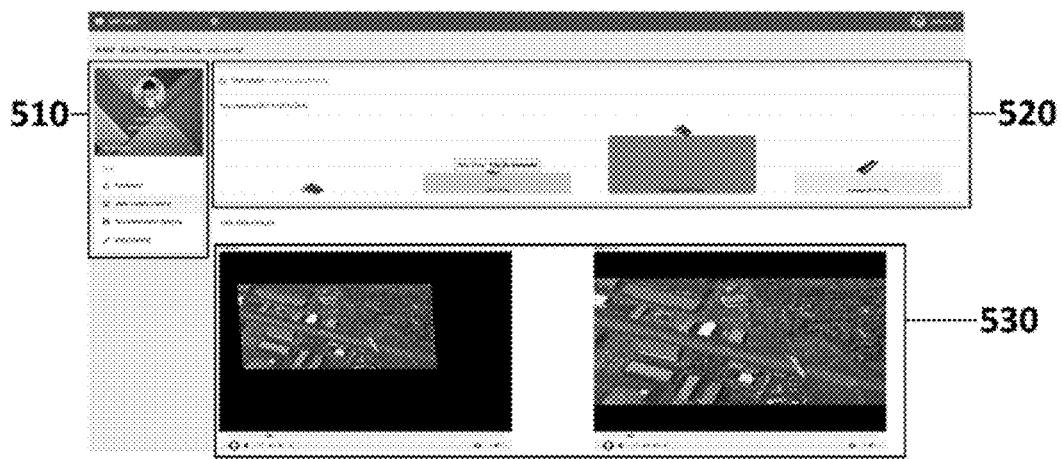
FIG. 14 depicts an exemplary visualization of front-end web layout with MUMOTs tracking results in accordance with various embodiments of the present disclosure.

Here FIG. 14 an example of front-end web layout. For example, Laravel 5, an open-source PHP web framework may be used for the development of web applications. Some of the features of Laravel are a modular packaging system with a dedicated dependency manager, different ways for accessing relational databases, utilities that aid in application deployment and maintenance. FIG. 14 illustrates the developed front-end web layout with three fields 510, 520 and 530. Field 510 is the designed control panel for front-end user operations. Field 520 refers to the task evaluation parameters (e.g., GPU execution time) and Field 530 shows the final detection and tracking results for users' references.

In front-end visualization, folders may be created, e.g., for storing and retrieving source images. In this example, one folder may be named as "Uploads", which is specialized to store all the un-processed images. Once user clients are uploading, all the uploaded source images can be transferred and relocated into this folder and get prepared for further processing. All the un-processed tasks are listed under, for example, a New Task Button, users can easily choose any tasks to submit for job processing. At the same time, uploading events can trigger to call MQ service (as illustrated in FIG. 1) for message communication. The other folder may be named as "Uploads_pending", which is used to store all the processing images. Once user clients are submitting any processing tasks via web layout, all the un-processed images can be compressed as zip/jar file and moved into this folder and get ready for delivering to HDFS for Hadoop running. All the submitted tasks can be recorded in the local database with their unique information.

Figure 15:
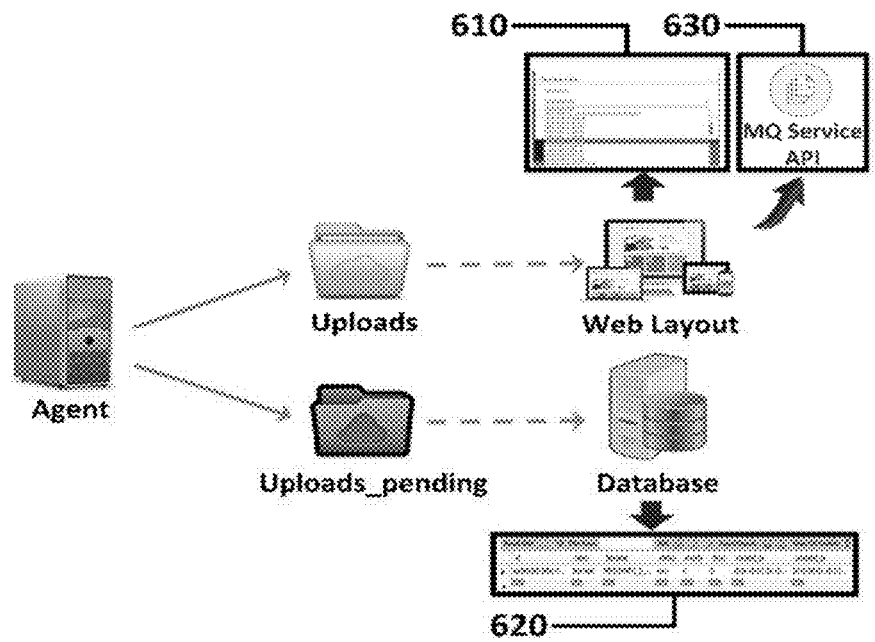
FIG. 15 depicts an example working procedure of extinguishing un-processed and processing tasks and the interaction results in local database in accordance with various embodiments of the present disclosure.

An exemplary workflow of extinguishing un-processed and processing tasks and the interactive results in local database is shown in FIG. 15. Component 610 is an example of web layout for uploading the tasks, Component 620 is an example of uploaded data stored in database and Component 630 refers to the API of MQ service. In addition, an interaction may be performed between web layout and MQ service API when client uploads the tasks.

For the message queuing (MQ) service, a MQ platform (e.g., for message transmission) may be used to guarantee the real-time interaction between back-end and front-end. The disclosed MQ platform is called and run for message communications under a micro-services architecture.

In an example of MQ platform, a third-party platform, such as IronMQ, may be used to facilitate many cloud APIs for hybrid functional interaction of MQ service. Any event is activated can trigger real-time calling from Iron cloud API towards online or local job processing environments. The true hybrid deployment can provide fully control and flexibility to manage the job processing. The system provides excellent performance in real-time synchronization with many standard code repository and methods such as Dockerhub, Github and Bitbucket, etc.

To integrate MQ serviced in the web implementation, a repository may be initially created for message communication in IronMQ platform. For example, two queues pools may be created. One is "ifx-web" for receiving all the incoming messages, and the other one may be "ifx-pull" for interacting and delivering all the outgoing messages. Then in next step, the local front-end web layout may be configured by compiling IronMQ repository token as follows:

```
'iron' => [
    'driver' => 'iron',
    'host' => 'mq-aws-us-east-1-1.iron.io',
    'token' => '6cnXtpWnfZ5H1FNxqQGqif8Putw',
    'project' => '579a5a0e959c100006d6bd57',
    'queue' => 'ifx-web',
    'encrypt' => false,
    'timeout' => 60,
]
```

After synchronizing the repository token of IronMQ service for both online MQ platform and local web layout, private functions start to be written to enable API calling. When any front-end uploading events (uploading pre-processing images) is activated, the queue function can be called and push a message with task information towards online repository.

As such, the system implementation architecture includes the back-end algorithm integration, the front-end web visualization, and message queuing (MQ) service as illustrated in FIG. 10.

In one embodiment, an exemplary method for detecting and tracking multiple moving targets based on wide-area motion imagery may include the following.

A message queuing (MQ) platform receives a task request from a client in a front-end web layout and then sends the task request to a local agent. In response to the task request, the local agent acquires to-be-processed images from the client, for example, by running a python script. The local agent calls an Hadoop application programming interface (API) and checking a running status of a Hadoop system for an available resource in the Hadoop system. When a resource in the Hadoop system is available, the local agent pushes the to-be processed images to a back-end Hadoop distributed file system (HDFS), for example, by running a python script. The Hadoop system runs tracking algorithms of multiple moving objects associated with the to-be-processed images to provide tracking results of the multiple moving objects. When the Hadoop system is completed in running the tracking algorithms, a message is generated and sent to the local agent, and the local agent further sends the message to the MQ platform. The local agent sends the tracking results of the multiple moving objects from the HDFS to the front-end database, for example, by enabling a python script.

Figure 11:
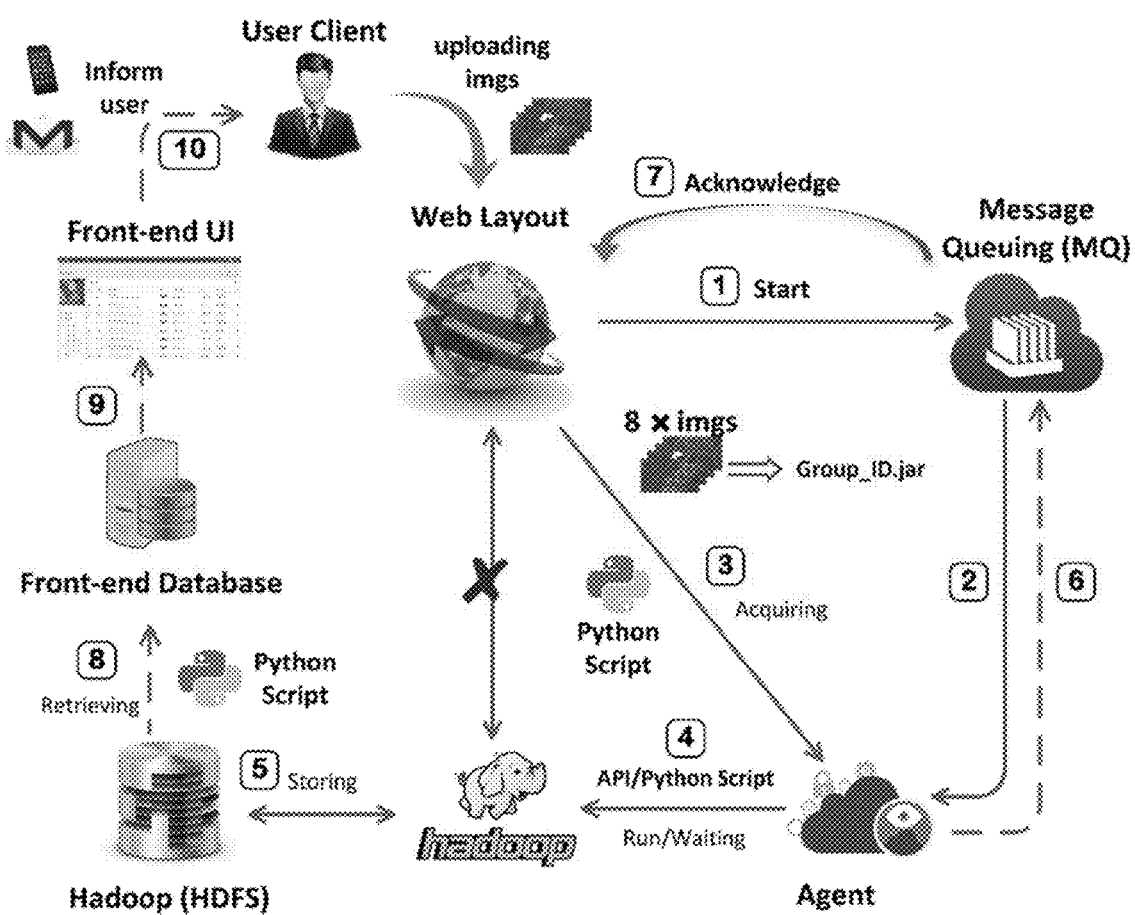
FIG. 11 depicts an exemplary workflow of a cloud-based high performance computation system in accordance with various embodiments of the present disclosure.

FIG. 11 depicts the workflow of an exemplary cloud-based high performance computation (HPC) system in accordance with various embodiments of the present disclosure.

Figure 16:
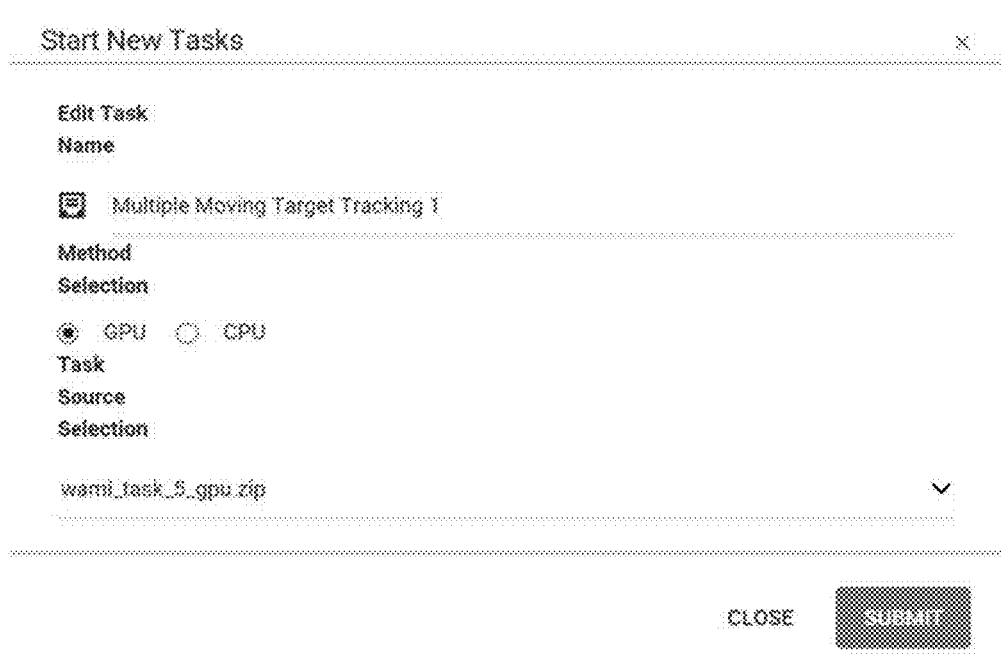
FIG. 16 presents an example of user request with task information submitted via front-end web layout in accordance with various embodiments of the present disclosure.
Figure 17:
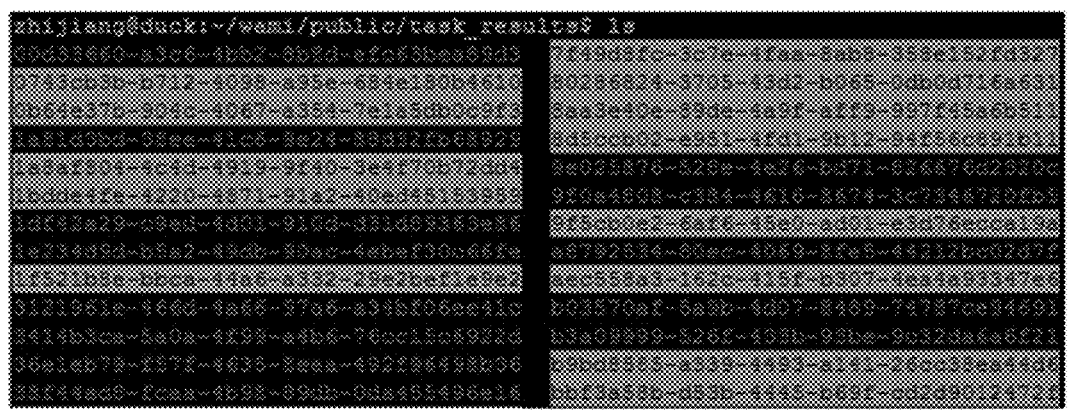
FIG. 17 shows an example of image results stored in Hadoop Distributed File System (HDFS) with assigned task ID in accordance with various embodiments of the present disclosure.

In Step 1, initially, at front-end service, users can login a client of the web layout and submit user requests (upload unprocessed images, request image detection results, etc.). The user request is delivered via MQ platform for providing online message transferring service. For instance, as shown in FIG. 16, user can submit any task requests with uploaded file (wami_task_5_gpu.zip as an example) and an acceleration method (e.g., by GPU or CPU).

In Step 2, MQ platform passes the message to a local agent, which is configured for storing all the images to be processed. The to-be-processed images include objects to be tracked. A task request is submitted and received by MQ platform with a task job ID (such as 1179f2df-ceff-4f28-8262).

In Step 3, after receiving the requests, a python script is running to enable data real-time streaming by acquiring to-be-processed images from the client in front-end web to local agent, all the uploaded images from user clients in Step 1 can be pushed to the storage in local agent and get ready for further processing.

In Step 4, Hadoop API is called to check running status of the images from the local agent. If there has any task is executing, the newly submitted task can be assigned for pending, if Hadoop is idle, local agent pushes the to-be processed images to a back-end Hadoop distributed file system (HDFS) by running a python script, then the new requested task can be automatically activated for running.

In Step 5, Hadoop system runs tracking algorithms of multiple moving objects associated with the to-be-processed images to provide tracking results. All the assigned image results (such as background image, foreground image, registration image and detection image) can be stored via HDFS. FIG. 8 shows an example of image results stored in HDFS with assigned task ID.

In Step 6, once the running task in Hadoop is finished, a new message is generated from local agent to online MQ platform. The detail message information is created including original task ID, task status, attempt times and queue repository name, such as {"data":{"task_id":"1179f2df-ceff-4f28-8262-8f0f19a4c510"},"attempt":1,"queue_repo": "ift-pull"}.

In Step 7, once MQ platform receives any message with status "completed", it can acknowledge front-end web layout via message queuing service.

Next, another python script is enabled for updating front-end database and retrieving generated image results from HDFS in Step 8.

Then all the related tracking results is retrieved and updated to display on front-end user interface in Step 9.

In Step 10, client is eventually informed for user interaction by some software services, such as coordination with an email or text message.

Various embodiments provide an implementation framework for MUMOTs detection and tracking based on WAMI images via HPCs. The implementation may include allocating computational resources according to a total number of WAMI images for parallel computation in HPC devices; enabling cloud and GPU high performance computation infrastructure with MapReduce procedures for MUMOTs detection and tracking; defining and customizing a working procedure for integrating a message queuing (MQ) service to guarantee the real-time performance; designing and customizing a working procedure of extinguishing un-processed and processing tasks and the interactive results in local database of HPC devices; developing a web-based data visualization system that presents the most useful data and obtains meaningful information for human analysts in support of high level information fusion, situation awareness, and context-enhanced information fusion.

As such, various embodiments provide method and system for a cloud and GPU-based high performance computation for MUMOTs detection and tracking, e.g., from WAMI image sequences. The disclosed system and method may provide a much faster, more reliable and real-time performance of detection and tracking as compared to situations when the workflow is applied on a single CPU or GPU alone. For example, the cloud-based high performance computation framework may concurrently process the WAMI data using different computational facilities, including computer clusters and graphical processing units (GPUs). One job of the task manager is to split the incoming image into sub-images which are then processed in parallel. Processing could be any number of analytics operations such as nonlinear target tracking, machine learning target recognition, and/or extended object intent analysis. The sub-results obtained are then combined task manager such as aligning and linking the information. The final results, such as tracks, recognitions, and threat identifications, are stored in the database and provided for visualization.

Figure 9:
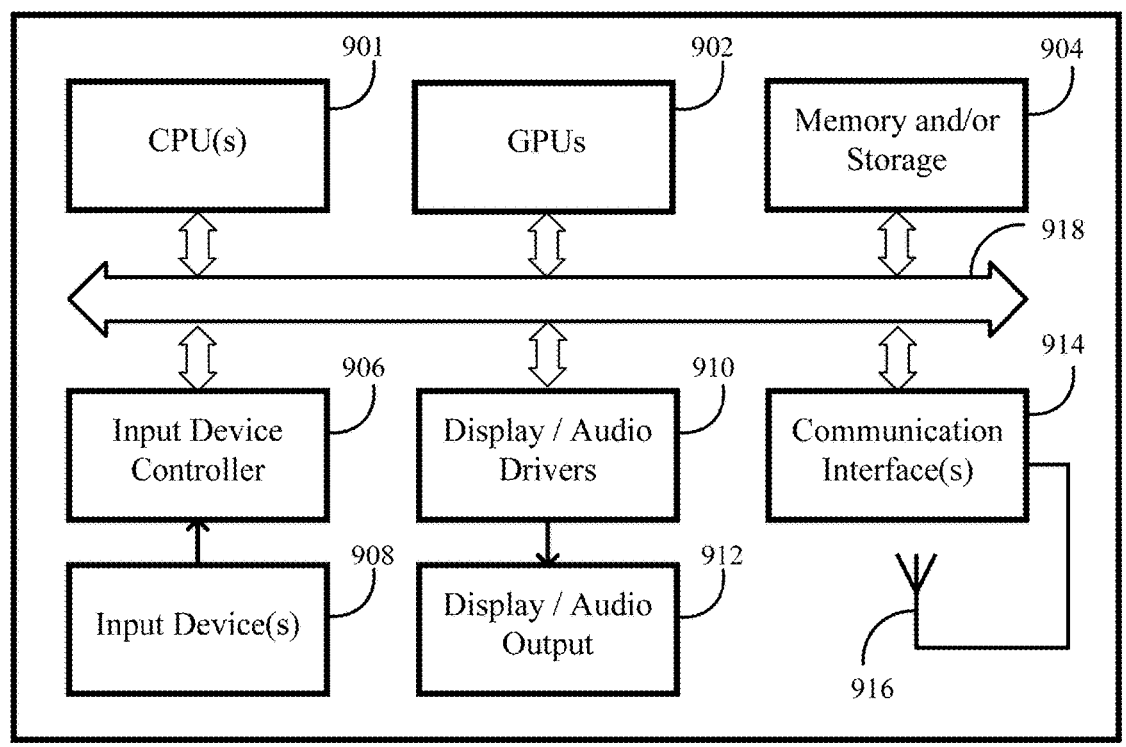
FIG. 9 illustrates a schematic diagram of hardware of an exemplary system for detecting multiple moving objects based on large scale images in accordance with some embodiments of the present disclosure.

Referring to FIG. 9, a schematic diagram of hardware of an exemplary system for detecting multiple moving objects based on large scale images is shown in accordance with some other embodiments of the present disclosure. Exemplary hardware may include CPU/GPUS, cloud operational and computation nodes, the local server, the local agent, the client, etc. as disclosed herein.

As illustrated in the exemplary system hardware 900, such hardware can include at least one central processing unit (CPU) 901, multiple graphics processing units (GPUs) 902, memory and/or storage 904, an input device controller 906, an input device 908, display/audio drivers 910, display and audio output circuitry 912, communication interface(s) 914, an antenna 916, and a bus 918.

At least one central processing unit (CPU) 901 can include any suitable hardware processor, such as a microprocessor, a micro-controller, digital signal processor, array processor, vector processor, dedicated logic, and/or any other suitable circuitry for controlling the functioning of a general purpose computer or special purpose computer in some embodiments.

The multiple graphics processing units (GPUs) 902 include at least four graphics processing units. The graphics processing unit can have any suitable form, such as dedicated graphics card, integrated graphics processor, hybrid form, stream processing form, general purpose GPU, external GPU, and/or any other suitable circuitry for rapidly manipulating memory to accelerate the creation of images in a frame buffer intended for output to a display in some embodiments.

In some embodiments, the at least one CPU 901 and the multiple GPUs 902 can implement or execute various embodiments of the present disclosure including one or more method, steps and logic diagrams. For example, as described above in connection with FIG. 1, the at least one CPU 901 can perform at least the steps of image partitions and classification visualization, etc. And the multiple GPUs 902 can perform at least the steps of block-wise registration, mask setting, background generation, foreground generation, classification, etc. In some embodiments, the multiple GPUs 902 can implement the functions in parallel, as illustrated in FIG. 1.

It should be noted that, the exemplary system hardware 900 is a GPU-CPU based system integrated by at least one CPU and multiple GPUs. In some embodiments, asynchronous transmission based on a new CUDA feature, Hyper-Q, can be implemented to reduce the communication between the CPU host and the GPUs. In some cases, the GPU-CPU based system integrated by at least one CPU and multiple GPUs may be used in the disclosed MapReduce implementation.

The steps of the disclosed method in various embodiments can be directly executed by a combination of the at least one CPU 901, and/or the multiple GPUs 902, and one or more software modules. The one or more software modules may reside in any suitable storage/memory medium, such as a random access memory, a flash memory, a read-only memory, a programmable read-only memory, an electrically erasable programmable memory, a register, etc. The storage medium can be located in the memory and/or storage 904. The at least one central processing unit (CPU) 901 and the multiple graphics processing units (GPUs) 902 can implement the steps of the disclosed method by combining the hardware and the information read from the memory and/or storage 904.

Memory and/or storage 904 can be any suitable memory and/or storage for storing programs, data, media content, comments, information of users and/or any other suitable content in some embodiments. For example, memory and/or storage 904 can include random access memory, read only memory, flash memory, hard disk storage, optical media, and/or any other suitable storage device.

Input device controller 906 can be any suitable circuitry for controlling and receiving input from one or more input devices 908 in some embodiments. For example, input device controller 906 can be circuitry for receiving input from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

Display/audio drivers 910 can be any suitable circuitry for controlling and driving output to one or more display and audio output circuitries 912 in some embodiments. For example, display/audio drivers 910 can be circuitry for driving an Liquid Crystal Display (LCD), a speaker, a Light Emitting Diode (LED), and/or any other display/audio device.

Communication interface(s) 914 can be any suitable circuitry for interfacing with one or more communication networks. For example, interface(s) 914 can include network interface card circuitry, wireless communication circuitry, and/or any other suitable circuitry for interfacing with one or more communication networks. In some embodiments, communication network can be any suitable combination of one or more wired and/or wireless networks such as the Internet, an intranet, a Wide Area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

Antenna 916 can be any suitable one or more antennas for wirelessly communicating with a communication network in some embodiments. In some embodiments, antenna 916 can be omitted when not needed.

Bus 918 can be any suitable mechanism for communicating between two or more of components 902, 904, 906, 910, and 914 in some embodiments. Bus 918 may be an enterprise service, such as an Industry Standard Architecture (ISA) bus, a Peripheral Component Interconnect (PCI) bus, an Extended ISA (EISA) bus, or any other suitable bus. The bus 918 can be divided into an address bus, a data bus, a control bus, etc. The bus 918 is represented as a two-way arrow in FIG. 9, but it does not mean that it is only one type bus or only one bus.

Any other suitable components can be included in hardware 900 in accordance with some embodiments.

In various embodiments, comparing with using GPU in the wide-area motion imagery (e.g., as shown in FIGS. 1-9), the cloud computing techniques may use GPU as an accelerator in cloud computing for the wide-area motion imagery (e.g., as shown in FIGS. 10-17). For example, the cloud-based computing (including Hadoop based MapReduce Implementation) processes WAMI images in a distributed manner, while the GPU (without using the cloud based computing techniques) processes WAMI images in a centralized manner.

As shown in FIGS. 10-17, MapReduce Implementation framework implements image splitting, mapping, shuffling, and reducer, as required by the MapReduce framework. All work is substantially implemented in the MapReduce framework. When using a strategy to split the image as shown in FIGS. 1-9, the mapping, shuffling, and reducer are not implemented.

In some embodiments, the hardware of the exemplary system for detecting multiple moving objects based on large scale images can be mounted onboard of an aerial platform such as an airplane, blimp, or unmanned aerial vehicle (UAV). In some other embodiments, the hardware of the exemplary system for detecting multiple moving objects based on large scale images can be placed on the ground from stationary or mobile platforms.

In addition, the flowcharts and block diagrams in the figures illustrate various embodiments of the disclosed method and system, as well as architectures, functions and operations that can be implemented by a computer program product. In this case, each block of the flowcharts or block diagrams may represent a module, a code segment, a portion of program code. Each module, each code segment, and each portion of program code can include one or more executable instructions for implementing predetermined logical functions. It should also be noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in. It should also be noted that, each block in the block diagrams and/or flowcharts, as well as the combinations of the blocks in the block diagrams and/or flowcharts, can be realized by a dedicated hardware-based system for executing specific functions, or can be realized by a dedicated system combined by hardware and computer instructions.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods and systems for detecting multiple moving objects based on large scale aerial images via high performance computing are provided. In the disclosed method and system, the moving objects visualization uses highly parallel algorithms to achieve a real-time performance.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure, which is only limited by the claims which follow. Features of the disclosed embodiments can be combined and rearranged in various ways. Without departing from the spirit and scope of the present disclosure, modifications, equivalents, or improvements to the present disclosure are understandable to those skilled in the art and are intended to be encompassed within the scope of the present disclosure.

What is claimed is:

1. A method for detecting and tracking multiple moving targets based on wide-area motion imagery, the method comprising:
   receiving, by a message queuing (MQ) platform, a task request from a client in a front-end web layout;
   sending, by the MQ platform, the task request to a local agent;
   acquiring, by the local agent, to-be-processed images from the client, in response to the task request;
   calling, by the local agent, an Hadoop application programming interface (API) and checking a running status of a Hadoop system for an available resource in the Hadoop system;
   when a resource in the Hadoop system is available, pushing, by the local agent, the to-be processed images to a back-end Hadoop distributed file system (HDFS);
   running, by the Hadoop system, tracking algorithms of multiple moving objects associated with the to-be-processed images to provide tracking results of the multiple moving objects;
   when the Hadoop system is completed in running the tracking algorithms, generating and sending a message to the local agent, wherein the local agent further sends the message to the MQ platform; and
   sending, by the local agent, the tracking results of the multiple moving objects from the HDFS to the front-end database.

2. The method according to claim 1, further comprising:
   acknowledging, by the MQ platform, the front-end web layout, when the MQ platform receives the message with a completed status from the local agent.

3. The method according to claim 1, further comprising:
visualizing the tracking results of the multiple moving objects to display on a front-end user interface; and
informing the client for user interaction.

4. The method according to claim 1, wherein checking the running status of the Hadoop system for the available resource in the Hadoop system includes:
pending the running of the tracking algorithms of the multiple moving objects associated with the to-be-processed images, when the Hadoop system is running another job, and
automatically running the tracking algorithms of the multiple moving objects associated with the to-be-processed images, when the Hadoop system is idle.

5. The method according to claim 1, wherein:
the tracking results are extracted from image results without keeping the image results,
the tracking results include trajectories of the multiple moving objects, and
each trajectory includes locations of a single object in consecutive to-be-processed images.

6. The method according to claim 5, wherein:
the image results include a background image, a foreground image, a registration image, and a detection image, and
the image results are stored or retrieved via HDFS.

7. The method according to claim 1, wherein:
the message sent from the local agent to the MQ platform comprises an assigned task job ID, a task status, attempt times, and a queue repository name.

8. The method according to claim 1, wherein:
the task request comprises one or more of uploading the to-be-process images and requesting tracking results, and
the task request includes an assigned task job ID.

9. The method according to claim 1, wherein:
the to-be-process images include images selected from wide-area motion imagery (WAMI) image dataset related to the multiple moving objects.

10. The method according to claim 1, wherein running, by the Hadoop system, the tracking algorithms of the multiple moving objects includes:
performing a MapReduce implementation for a registration, a background generation, a foreground estimation, and a data association.

11. The method according to claim 10, wherein:
the data association combines at least positions of a detected multiple moving object in consecutive WAMI frames into target trajectories.

12. The method according to claim 10, wherein:
MapReduce implementation uses a reducer to perform a summary operation to generate target track IDs and save detection and trajectories information of the multiple moving objects in the HDFS.

13. A system for detecting and tracking multiple moving targets based on wide-area motion imagery, the system comprising:
a message queuing (MQ) platform; a local agent; and a Hadoop system,
wherein:
the message queuing (MQ) platform receives a task request from a client in a front-end web layout, and sends the task request to the local agent,
the local agent acquires to-be-processed images from the client, in response to the task request, calls an Hadoop application programming interface (API) to check a running status of a Hadoop system for an available resource in the Hadoop system, and pushes the to-be processed images to a back-end Hadoop distributed file system (HDFS), when a resource in the Hadoop system is available,
the Hadoop system runs tracking algorithms of multiple moving objects associated with the to-be-processed images to provide tracking results of the multiple moving objects, generates and sends a message to the local agent, when the Hadoop system is completed in running the tracking algorithms, and
the local agent further sends the message to the MQ platform, and sends the tracking results of the multiple moving objects from the HDFS to the front-end database.

14. The system according to claim 13, wherein:
the MQ platform acknowledges the front-end web layout, when the MQ platform receives the message with a completed status from the local agent.

15. The system according to claim 13, wherein:
the tracking results of the multiple moving objects is visualized to display on a front-end user interface.

16. The system according to claim 13, wherein:
the tracking results are extracted from image results without keeping the image results,
the tracking results include trajectories of the multiple moving objects, and
each trajectory includes locations of a single object in consecutive to-be-processed images.

17. The system according to claim 16, wherein:
the image results include a background image, a foreground image, a registration image, and a detection image, and
the image results are stored or retrieved via HDFS.

18. The system according to claim 13, wherein:
the message sent from the local agent to the MQ platform comprises an assigned task job ID, a task status, attempt times, and a queue repository name.

19. The system according to claim 13, wherein:
the task request comprises one or more of uploading the to-be-process images and requesting tracking results, and
the task request includes an assigned task job ID.

20. The system according to claim 13, wherein:
the to-be-process images include images selected from wide-area motion imagery (WAMI) image dataset related to the multiple moving objects.

* * * * *